United States Patent
Sun et al.

(10) Patent No.: US 12,492,678 B1
(45) Date of Patent: Dec. 9, 2025

(54) METHOD FOR CONTROLLING A POWER OUTPUT OF A GRID FORMING WIND TURBINE

(71) Applicant: VESTAS WIND SYSTEMS A/S, Aarhus N (DK)

(72) Inventors: Bo Sun, Aarhus N (DK); Sönke Engelken, Silkeborg (DK); Torsten Lund, Fredericia (DK); Germán Claudio Tarnowski, Tilst (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 19/193,182

(22) Filed: Apr. 29, 2025

(30) Foreign Application Priority Data

Nov. 19, 2024 (DK) .............................. PA202430709

(51) Int. Cl.
  *F03D 7/02* (2006.01)
  *F03D 7/04* (2006.01)

(52) U.S. Cl.
  CPC ............ *F03D 7/0284* (2013.01); *F03D 7/047* (2013.01); *F05B 2270/1033* (2013.01); *F05B 2270/337* (2013.01)

(58) Field of Classification Search
  CPC ....... Y02E 10/72; F03D 7/0284; F03D 9/255; H02P 2101/15
  See application file for complete search history.

(56) References Cited

U.S. PATENT DOCUMENTS

| | | | |
|---|---|---|---|
| 7,345,373 B2* | 3/2008 | Delmerico | F03D 7/0276 290/44 |
| 11,293,400 B2* | 4/2022 | Ou | F03D 7/046 |
| 2024/0429842 A1* | 12/2024 | Li | H02J 3/38 |

FOREIGN PATENT DOCUMENTS

| | | | | |
|---|---|---|---|---|
| CN | 118040715 A | 5/2024 | | |
| CN | 118508534 A | 8/2024 | | |
| EP | 3404258 A1 * | 11/2018 | ........... | F03D 7/0284 |

OTHER PUBLICATIONS

1st Technical Examination Report issued to patent application No. PA202430709 on Apr. 25, 2025.

* cited by examiner

*Primary Examiner* — Darrin D Dunn
(74) *Attorney, Agent, or Firm* — Patterson + Sheridan, LLP; Gero G. McClellan

(57) ABSTRACT

A method for controlling a power output of a grid forming wind turbine (1) in order to dampen power oscillations between a power grid (13) to which the wind turbine (1) is connected and the wind turbine (1) is disclosed. A damping power reference, $P_D$, depending on a grid frequency of the power grid (13) and/or on a virtual rotor speed is calculated, with the purpose of dampening oscillations in the power output of the grid side converter (11). A power output of the grid side converter (11) is controlled, in accordance with a grid side power reference, $P_{ref}$, and taking the damping power reference, $P_D$, into account. A feedforward power reference for the machine side converter (10) is generated, the feedforward power reference including the damping power reference, $P_D$, and an inertia power reference, $P_I$, proportional to the time derivative of the grid frequency, and a power output of the machine side converter (10) is controlled at least partly based on the feedforward power reference.

8 Claims, 6 Drawing Sheets

METHOD FOR CONTROLLING A POWER OUTPUT OF A GRID FORMING WIND TURBINE

FIELD OF THE INVENTION

The present invention relates to a method for controlling a power output of a grid forming wind turbine, i.e. a wind turbine that is configured to mimic synchronous generator behaviour, with the purpose of contributing to maintaining a stable power grid.

BACKGROUND OF THE INVENTION

In order to allow for a higher penetration of renewable energy sources, such as wind turbines, in power grids, it has been proposed that wind turbines, in particular power converters of wind turbines, are equipped with grid forming properties similar to conventional synchronous generators. This will allow the wind turbines to mimic the behaviour of a synchronous generator, thus contributing to maintaining the stability of the power grid, in particular with regard to power oscillations in the power grid. Such wind turbines are sometimes referred to as 'grid forming wind turbines'.

The grid forming properties can, e.g., be provided by configuring the wind turbines as virtual synchronous machines, and the mimicking behaviour may be modelled by a second order swing equation, including inertia response and damping power. The damping power part of the swing equation plays an important part in dampening frequency oscillations in the power grid. However, if the converter of the grid forming wind turbine is of a kind where a DC link controller is implemented in the grid side converter control, the response of the DC link controller may cancel out, or at least significantly reduce, the inertial effect and the damping power effect, because the DC link controller will seek to keep the voltage at the DC link at a certain reference level, and therefore will counteract the changes caused by the damping power part of the swing equation. Thus, there is a risk that the desired damping of power oscillations in the power grid is not obtained.

DESCRIPTION OF THE INVENTION

It is an object of embodiments of the invention to provide a method for controlling a power output of a grid forming wind turbine, in which inertia response and damping of power oscillations between the power grid and the wind turbine is obtained in a reliable and efficient manner.

The invention provides a method for controlling a power output of a grid forming wind turbine in order to dampen power oscillations between a power grid to which the wind turbine is connected and the wind turbine, the wind turbine comprising a generator, a machine side converter connected to the generator, a grid side converter configured to supply power to the power grid, and a DC link interconnecting the machine side converter and the grid side converter, the method comprising the steps of:
 providing a grid side power reference, $P_{ref}$,
 calculating a damping power reference, $P_D$, depending on a grid frequency of the power grid and/or on a virtual rotor speed, with the purpose of dampening oscillations in the power output of the grid side converter, calculating an inertia power reference, $P_I$, proportional to the time derivative of the grid frequency,
 controlling a power output of the grid side converter, in accordance with the grid side power reference, $P_{ref}$, and taking the damping power reference, $P_D$, into account,
 generating a feedforward power reference for the machine side converter, the feedforward power reference including the damping power reference, $P_D$, and the inertia power reference, $P_I$, and
 controlling a power output of the machine side converter at least partly based on the feedforward power reference.

Thus, the method according to the invention is a method for controlling a power output of a grid forming wind turbine. In the present context the term 'grid forming wind turbine' should be interpreted to mean a wind turbine that is configured to mimic synchronous generator behaviour. Thus, the wind turbine being controlled is of a kind which is capable of contributing to maintaining the stability of the power grid, thus allowing for higher penetration of renewable power sources in the power grid.

The wind turbine comprises a generator, a machine side converter connected to the generator, a grid side converter configured to supply power to the power grid, and a DC link interconnecting the machine side converter and the grid side converter. When the wind turbine operates, wind acting on wind turbine blades of the wind turbine will cause a rotor to rotate. The rotational movements are transferred to the generator, possibly via a gear system, where the mechanical energy is transformed into electrical energy, in the form of AC power. The machine side converter converts the AC power output of the generator into DC power and supplies this to the DC link. The grid side converter converts the DC power into AC power with a frequency being suitable for supplying to the power grid.

In the method according to the invention, a grid side power reference, $P_{ref}$, IS provided. The grid side power reference, $P_{ref}$, represents an active power level requested by the power grid and/or by a power plant controller of a renewable power plant which the wind turbine forms part of, and it may, thus, be regarded as a grid provided active power setpoint for the wind turbine, more particularly for the grid side converter of the wind turbine.

Furthermore, a damping power reference, $P_D$, is calculated. The damping power reference, $P_D$, represents power oscillations between the power grid and the wind turbine, and it is calculated with the purpose of dampening oscillations in the power output of the grid side converter. More particularly, the calculated damping power reference, $P_D$, depends on a grid frequency of the power grid and/or on a virtual rotor speed.

Accordingly, information regarding power oscillations occurring between the power grid and the wind turbine is obtained, in the form of the grid frequency and/or the virtual rotor speed, and the damping power reference, $P_D$, is calculated based thereon, in such a manner that it indicates how the power output of the grid side converter should be controlled in order to dampen the currently occurring power oscillations between the power grid and the wind turbine. For instance, the damping power reference, $P_D$, may indicate how the power output of the grid side converter should be controlled in order to dampen oscillations in the power grid and/or in the virtual rotor defined by the grid forming wind turbine.

Thus, the damping power reference, $P_D$, may be regarded as an additional active power setpoint for the wind turbine, more particularly for the grid side converter of the wind turbine, which ensures that the power output of the wind turbine contributes to damping of power oscillations between the power grid and the wind turbine.

Furthermore, an inertia power reference, $P_I$, is calculated. The inertia power reference, $P_I$, is proportional to the time derivative of the grid frequency, and it thus represents the inertia response part of the virtual synchronous machine mimicked by the grid forming wind turbine.

The power output of the grid side converter is then controlled in accordance with the grid side power reference, $P_{ref}$, and taking the damping power reference, $P_D$, into account. Accordingly, it is ensured that the power output of the grid side converter, and thus the power supplied to the power grid by the wind turbine, meets the requirements and needs of the power grid with regard to active power level, due to the grid side power reference, $P_{ref}$, as well as contributes to damping of power oscillations between the power grid and the wind turbine, due to the damping power reference, $P_D$, being taken into account.

Furthermore, a feedforward power reference is generated for the machine side converter. The feedforward power reference includes the damping power reference, $P_D$, and the inertia power reference, $P_I$. The feedforward power reference may be regarded as a power setpoint for the machine side converter, based on which the machine side converter should be at least partly controlled. Since the feedforward power reference includes the damping power reference, $P_D$, as well as the inertia power reference, $P_I$, it takes into account the part of the control of the power output of the grid side converter which provides damping of the power oscillations between the power grid and the wind turbine, as well as the inertia response part of the virtual synchronous machine mimicked by the grid forming wind turbine.

Finally, the power output of the machine side converter is controlled at least partly based on the feedforward power reference. Since the feedforward power reference takes the damping power reference, $P_D$, into account, as described above, the control of the machine side converter is performed with due consideration to the oscillation damping part of the control of the grid side converter, and it is therefore ensured that the machine side converter is controlled in a manner which does not cancel out or significantly reduce the oscillation damping provided to the power grid by the wind turbine. This results in reliable and efficient damping of power oscillations between the power grid and the wind turbine.

Moreover, since the feedforward power reference also takes the inertia power reference, $P_I$, into account, it is also ensured that the inertia response provided by the wind turbine is not cancelled out or significantly reduced.

The step of generating a feedforward power reference may comprise combining the damping power reference, $P_D$, and the inertia power reference, $P_I$, into a combined feedforward power reference, and the step of controlling a power output of the machine side converter may be performed at least partly based on the combined feedforward power reference.

According to this embodiment, a single feedforward power reference is generated which includes the damping power reference, $P_D$, as well as the inertia power reference, $P_I$. For instance, the feedforward power reference may be generated by adding the damping power reference, $P_D$, and the inertia power reference, $P_I$. Alternatively, the feedforward power reference may be generated in a more complex manner and/or it may include further components than the damping power reference, $P_D$, and the inertia power reference, $P_I$.

As an alternative, the step of generating a feedforward power reference may comprise generating a first feedforward power reference based on the damping power reference, $P_D$, and a second feedforward power reference based on the inertia power reference, $P_I$, and the step of controlling a power output of the machine side converter may be performed at least partly based on the first feedforward power reference as well as on the second feedforward power reference.

According to this embodiment, two separate feedforward power references are generated, in the form of the first feedforward power reference and the second feedforward power reference, respectively. The first feedforward power reference is based on the damping power reference, $P_D$, while the second feedforward power reference is based on the inertia power reference, $P_I$. Thus, in this case, rather than combining the damping power reference, $P_D$, and the inertia power reference, $P_I$, into a single feedforward power reference, two separate feedforward power references are generated, representing the oscillation damping and the inertia response, respectively. When controlling the power output of the machine side converter both of these feedforward power references are taken into account.

The first feedforward power reference may simply be the damping power reference, $P_D$, and/or the second feedforward power reference may simply be the inertia power reference, $P_I$. In another embodiment, the first feedforward power reference may include other components than the damping power reference, $P_D$, and/or the second feedforward power reference may include other components than the inertia power reference, $P_I$. For instance, the damping power reference, $P_D$, may be combined with a general power setpoint for the machine side converter to form the first feedforward power reference, or the inertia power reference, $P_I$, may be combined with the general power setpoint for the machine side converter to form the second feedforward power reference.

The step of generating a feedforward power reference may be performed by a controller of the grid forming wind turbine. According to this embodiment, the feedforward power reference is generated locally at the grid forming wind turbine, and thus within the system where it is supposed to be applied. Thereby delays and/or latencies due to communication with external entities are avoided, thus allowing the machine side converter to compensate for variations caused by the oscillation damping and the inertia response in real time or near real time.

For instance, the step of generating a feedforward power reference may be performed by a controller of the grid side converter. This is a suitable choice because at least the damping power reference, $P_D$, is readily available to the controller of the grid side converter, since the damping power reference, $P_D$, is taken into account when controlling the grid side converter.

As an alternative, the feedforward power reference may be generated by another controller of the grid forming wind turbine, e.g. a controller of the machine side converter or a main controller of the wind turbine.

Alternatively, the step of generating a feedforward power reference may be performed at least partly by a power plant controller configured to control a renewable power plant which the wind turbine forms part of. According to this embodiment, the wind turbine forms part of a renewable power plant, i.e. a power plant comprising a plurality of renewable power generators, such as wind turbines and/or photovoltaic power generators. The renewable power plant comprises a power plant controller, i.e. a controller being responsible for the overall control of the renewable power generators within the renewable power plant. For instance, the power plant controller may be responsible for ensuring that the combined or total power output from the renewable power plant to the power grid fulfils certain requirements, and for dispatching power setpoints to the individual renewable power generators in order to achieve this.

According to this embodiment, the feedforward power reference is at least partly generated by the power plant controller, rather than by a controller of the grid forming wind turbine. Furthermore, the feedforward power reference may be supplied from the power plant controller to a controller of the machine side converter. For instance, the feedforward power reference may, in addition to the damping power reference, $P_D$, and the inertia power reference, $P_I$, include a part representing a grid based power reference for the wind turbine, dispatched by the power plant controller.

The feedforward power reference may be generated by the power plant controller only. Alternatively, part of the feedforward power reference may be generated by the power plant controller, while another part may be generated by one or more other components, such as one or more controllers of the grid forming wind turbine. For instance, a part of the feedforward power reference including the damping power reference, $P_D$, may be generated by the power plant controller, whereas a part including the inertia power reference, $P_I$, may be generated by a controller of the grid forming wind turbine.

The step of calculating a damping power reference, $P_D$, may comprise calculating a damping power reference, Pp, being proportional to a deviation between the grid frequency of the power grid and the virtual rotor speed. The deviation between the grid frequency and the virtual rotor speed can be caused by oscillations in the virtual rotor speed and/or other units in the grid. A power contribution proportional to the difference in these frequencies is similar to the response of a damper winding in a synchronous machine which has a dampening effect on the oscillations. It is therefore suitable that damping power reference, $P_D$, is proportional to this deviation.

As an alternative, the step of calculating a damping power reference, $P_D$, may comprise applying a washout filter to a signal being proportional to the grid frequency. In the present context, the term 'washout filter' should be interpreted to mean a stable high pass filter with zero static gain.

Thus, according to this embodiment, the steady state contribution is filtered out so the damping term does not react to a steady state frequency deviation.

BRIEF DESCRIPTION OF THE DRAWINGS

The invention will now be described in further detail with reference to the accompanying drawings in which.

DETAILED DESCRIPTION OF THE DRAWINGS

Figure 1:
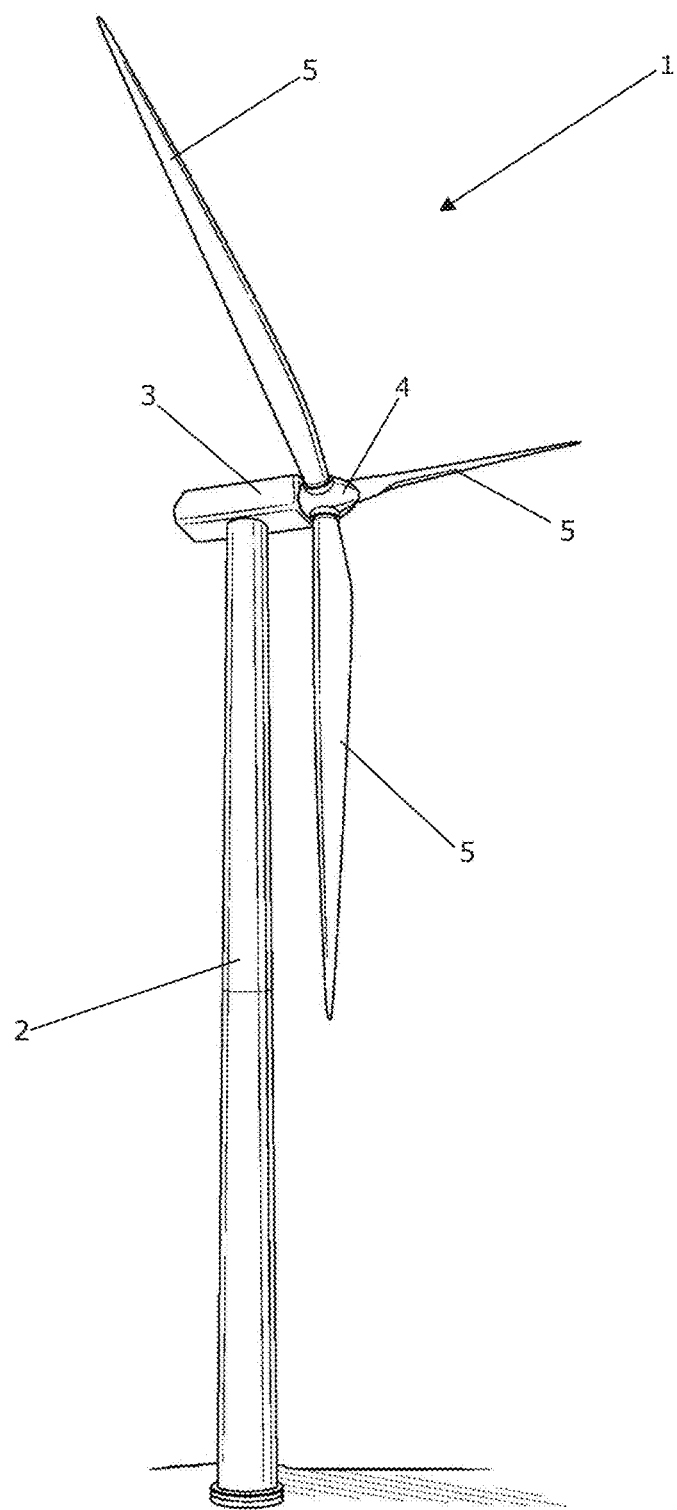
FIG. 1 is a perspective view of a wind turbine which may be controlled in accordance with a method according to an embodiment of the invention.

FIG. 1 is a perspective view of a wind turbine 1 comprising a tower 2 and a nacelle 3 mounted on top of the tower 2. A rotor with a hub 4 carrying three wind turbine blades 5 is rotatably connected to the nacelle 3. Wind acting on the wind turbine blades 5 causes the hub 4 to rotate, and the rotating movement is transferred to a generator (not visible), possibly via a gearbox (not visible). In the generator, the mechanical energy is transformed into electrical energy, which may subsequently be supplied to a power grid. The generator and the gearbox may be arranged inside the nacelle 3.

Figure 2:
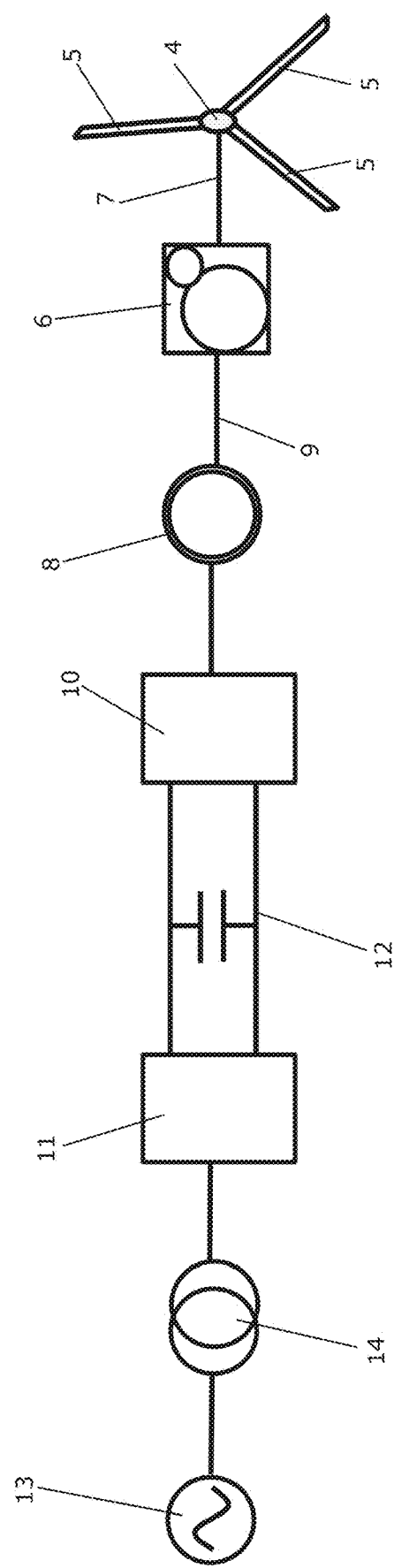
FIG. 2 is a diagrammatic view of selected components of a wind turbine which may be controlled in accordance with a method according to an embodiment of the invention.

FIG. 2 is a diagrammatic view of selected components of a wind turbine which may be controlled in accordance with a method according to an embodiment of the invention. More particularly, FIG. 2 illustrates a rotor of the wind turbine, including a hub 4 carrying three wind turbine blades 5, as also illustrated in FIG. 1. The hub 4 is connected to a gearbox 6 via a low speed shaft 7, and the gearbox 6 is connected to a generator 8 via a high speed shaft 9.

Furthermore, FIG. 2 illustrates a machine side converter 10, a grid side converter 11 and a DC link 12 interconnecting the machine side converter 10 and the grid side converter 11. The machine side converter 10 is electrically connected to the generator 8 and converts AC power received from the generator 8 into DC power, and supplies this to the DC link 12. The grid side converter 11 receives DC power from the DC link 12, converts this into AC power with a frequency suitable for being supplied to a power grid 13, and supplies the AC power to a transformer 14, where a suitable voltage level is obtained before the power is supplied to the power grid 13.

The machine side converter 10 and the grid side converter 11 are controlled essentially independently of each other. The machine side converter 10 is normally controlled in such a manner that the power provided to the power grid 13 is in accordance with various requirements of the power grid 13. The grid side converter 11 may, e.g., be controlled in order to maintain a certain voltage at the DC link 12.

When the wind turbine is a grid forming wind turbine, the grid side converter 11 is controlled in such a manner that it, to a certain extent, mimics the behaviour of a synchronous generator, in order to contribute to maintaining the stability of the power grid 13, in particular with regard to power oscillations between the power grid 13 and the wind turbine 1. In order to obtain this, a damping power reference, $P_D$, representing power oscillations between the power grid 13 and the wind turbine, is calculated, and the power output of the grid side converter 11 is then controlled in accordance with a grid side power reference, $P_{ref}$, and taking the calculated damping power reference, Pp, into account. The damping power reference, $P_D$, is calculated in such a manner that, when the grid side converter 11 is controlled in a manner which takes the damping power reference, $P_D$, into account, it contributes to damping of power oscillations between the power grid 13 and the wind turbine 1. More particularly, controlling the grid side converter 11 in this manner results in damping of oscillations in the power output of the grid side converter 11.

However, controlling the grid side converter 11 in this manner affects the voltage at the DC link 12. Therefore, in order to avoid that the control of the machine side converter 10 counteracts or cancels the oscillation damping part of the control of the grid side converter 11, a feedforward power reference for the machine side converter 10 is generated, including the damping power reference, $P_D$, and an inertia power reference, $P_I$. Thus, the expected impact on the voltage at the DC link 12, caused by the damping part and the inertia response part of the control of the grid side converter 11, is taken directly into account in the power reference for the machine side converter 10.

Figure 3:
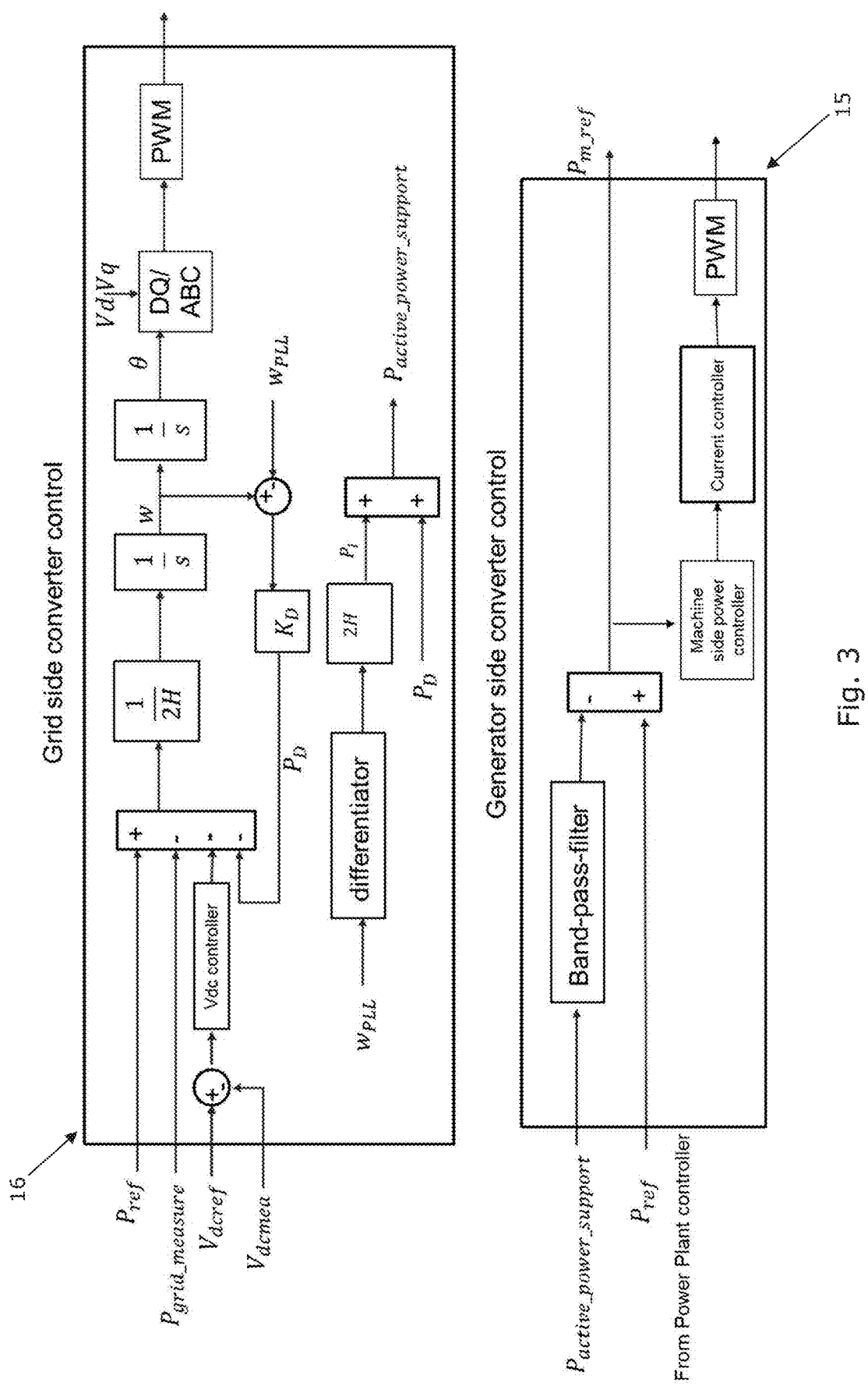
FIG. 3 illustrates a method for controlling a grid forming wind turbine according to a first embodiment of the invention.

FIG. 3 illustrates a method for controlling a grid forming wind turbine according to a first embodiment of the invention, in the form of a machine side converter controller 15 and a grid side converter controller 16.

The grid side converter controller 16 receives a grid side power reference, $P_{ref}$, and a measured value of the power, $P_{grid\_measure}$, actually supplied to the power grid. Moreover, a signal representing the voltage at the DC link, Vdc controller, is received.

A damping power reference, $P_D$, is calculated as the difference between the rotational speed of the power grid, $\omega_{PLL}$, being representative for the grid frequency of the power grid, and the virtual rotor speed, $\omega$, of the synchronous machine mimicked by the wind turbine, multiplied by a damping factor, $K_D$. The power output of the grid side converter is then controlled in accordance with the grid side power reference, $P_{ref}$, and taking the damping power reference, $P_D$, into account. Thus, the power output of the grid side converter contributes to damping of oscillations between the power grid and the wind turbine.

Furthermore, the grid side converter controller 16 generates a feedforward power reference, $P_{active\_power\_support}$, based on the damping power reference, $P_D$, and on an inertia power reference, $P_I$, calculated based on the rotational speed of the power grid, $\omega_{PLL}$. The feedforward power reference, $P_{active\_power\_support}$, IS provided to the machine side converter controller 15.

The machine side converter controller 15 further receives a power reference, $P_{ref}$, from a power plant controller, and the machine side converter is controlled in accordance with the power reference, $P_{ref}$, as well as in accordance with the feedforward power reference, $P_{active\_power\_support}$, and thus in accordance with the damping power reference, $P_D$, and the inertia power reference, $P_I$. Accordingly, it is avoided that the machine side converter is controlled in a manner which counteracts or cancels out the power oscillation damping provided by the power output of the grid side converter.

Figure 4:
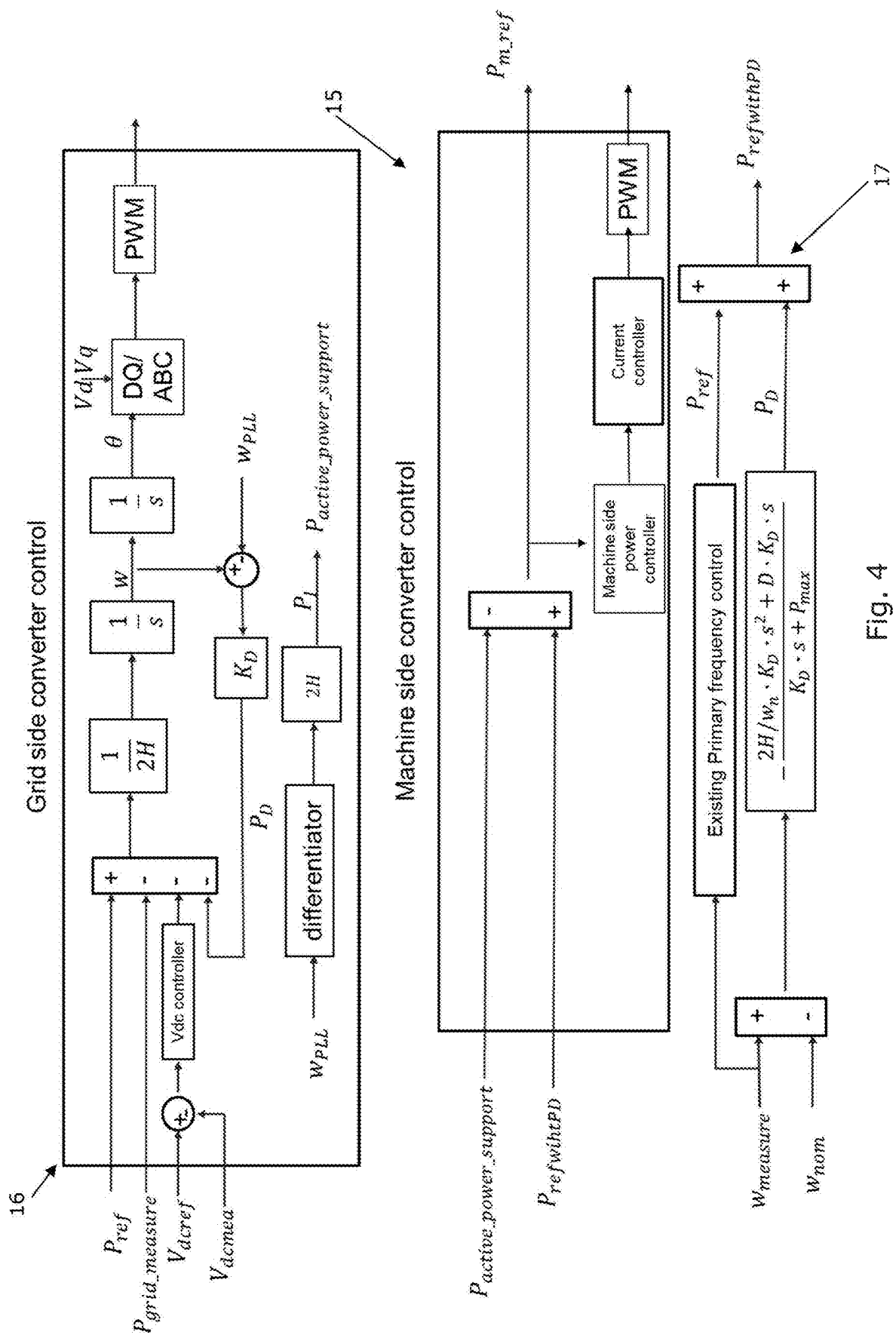
FIG. 4 illustrates a method for controlling a grid forming wind turbine according to a second embodiment of the invention.

FIG. 4 illustrates a method for controlling a grid forming wind turbine according to a second embodiment of the invention. The embodiment illustrated in FIG. 4 is very similar to the embodiment illustrated in FIG. 3, and it will therefore not be described in detail here.

However, in the embodiment illustrated in FIG. 4, the feedforward power reference provided from the grid side converter controller 16 to the machine side converter controller 15 is not based on the damping power reference, $P_D$, but merely constitutes an inertia power reference, $P_I$.

Instead, the power plant controller 17 calculates a damping power reference, $P_D$, and includes this in the power reference, $P_{refwithPD}$, provided from the power plant controller 17 to the machine side converter controller 15. Thus, the control of the machine side converter still takes the damping power reference, $P_D$, into account, but it is included in the power reference, $P_{refwithPD}$, received from the power plant controller 17, rather than in the power reference, $P_{active\_power\_support}$, received from the grid side converter controller 16.

Figure 5:
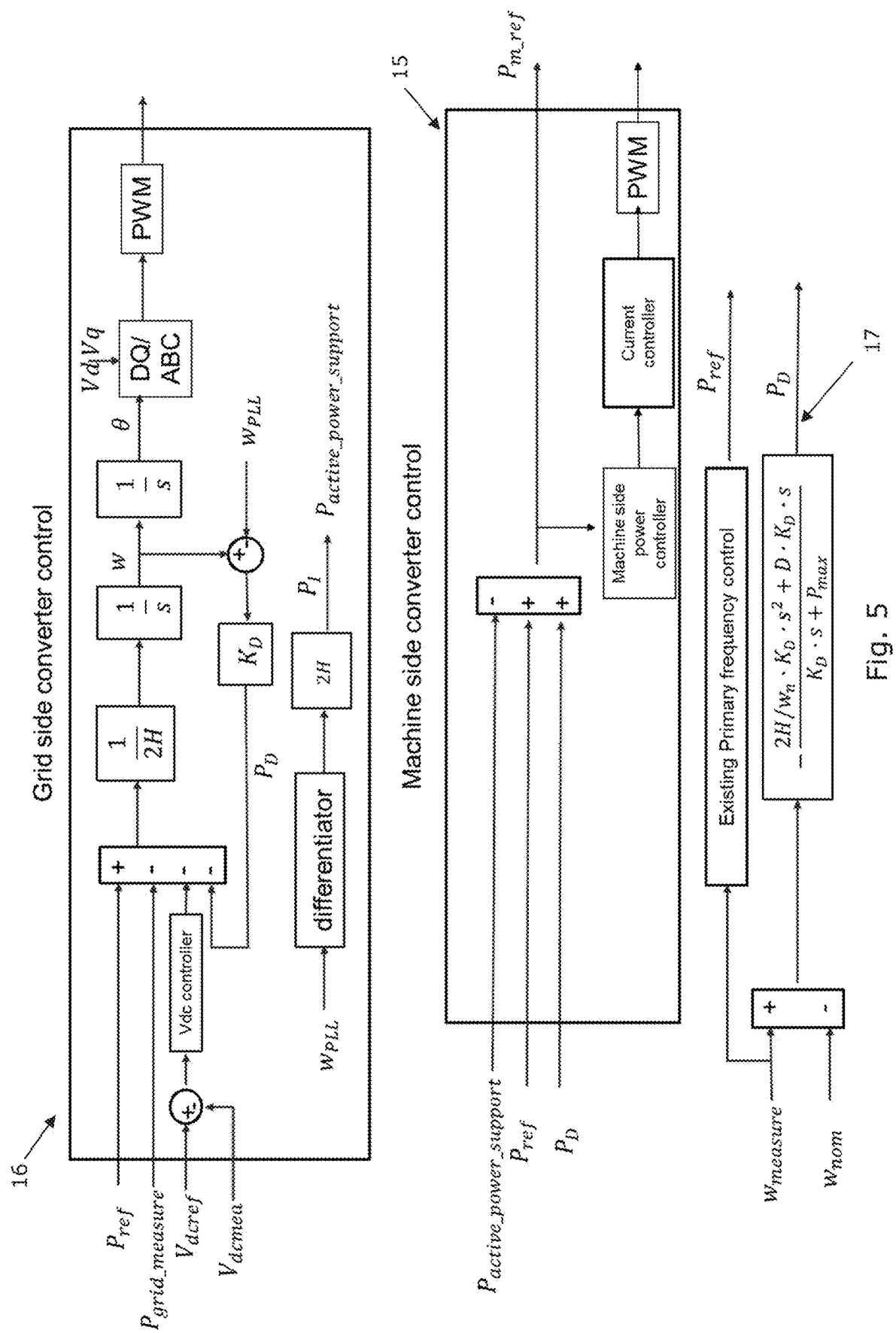
FIG. 5 illustrates a method for controlling a grid forming wind turbine according to a third embodiment of the invention.

FIG. 5 illustrates a method for controlling a grid forming wind turbine according to a third embodiment of the invention. The embodiment illustrated in FIG. 5 is very similar to the embodiments illustrated in FIGS. 3 and 4, and it will therefore not be described in detail here.

In the embodiment illustrated in FIG. 5, the damping power reference, $P_D$, is generated by the power plant controller 17, similarly to the embodiment illustrated in FIG. 4. However, instead of including the damping power reference, $P_D$, into the power reference, $P_{refwithPD}$, the power plant controller 17 supplies the power reference, $P_{ref}$, and the damping power reference, $P_D$, to the machine side converter controller 15 as two separate power reference values. The machine side converter controller 15 then ensures that the output of the machine side converter is controlled in accordance with the inertia power reference, $P_{active\_power\_support}$, received from the grid side converter controller 16, the power reference, $P_{ref}$, received from the power plant controller 17, as well as the damping power reference, $P_D$.

Figure 6:
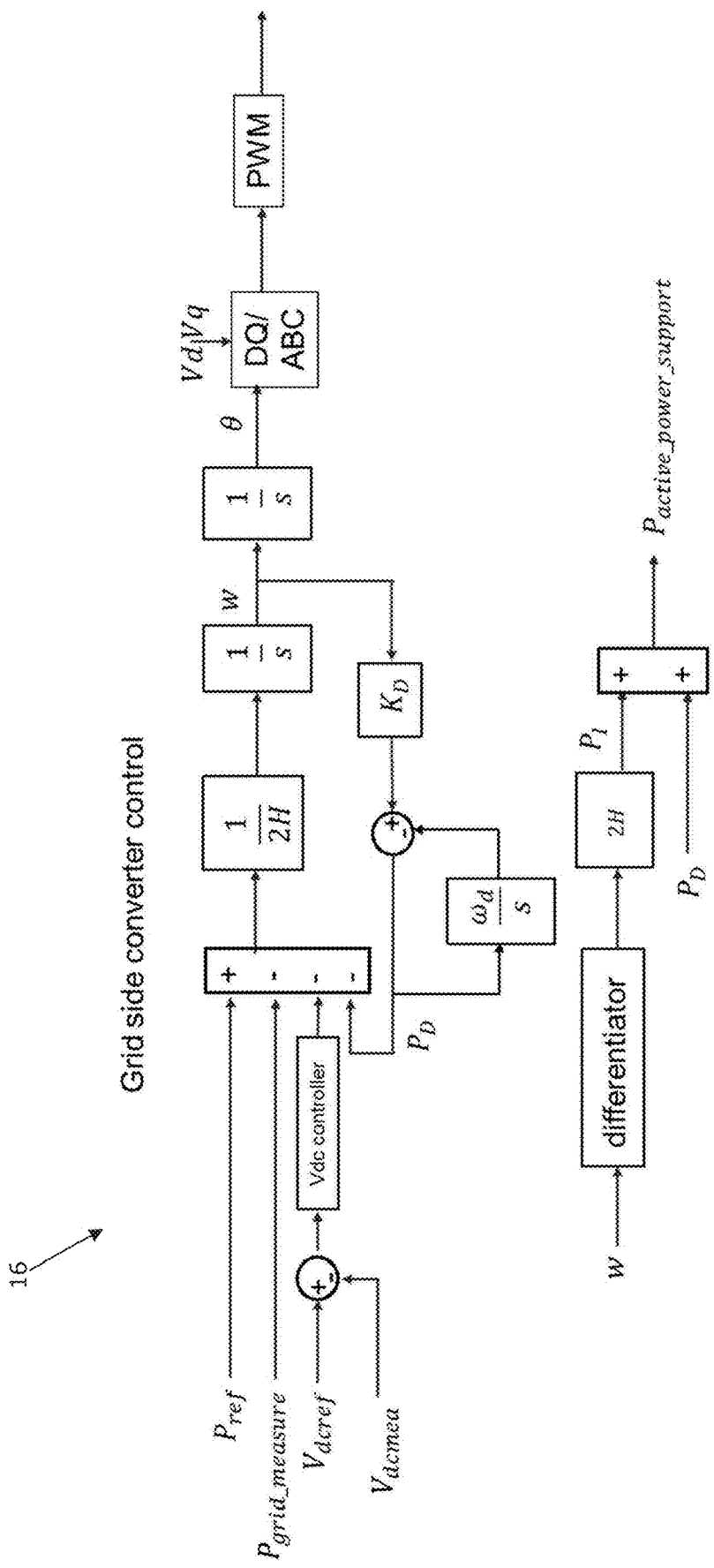
FIG. 6 illustrates an alternative method for calculating a damping power reference, $P_D$, as part of a method according to an embodiment of the invention.

FIG. 6 illustrates an alternative method for calculating a damping power reference, $P_D$, as part of a method according to an embodiment of the invention. Instead of calculating the damping power reference, $P_D$, based on the difference between the rotational speed of the power grid, $\omega_{PLL}$, and the virtual rotor speed, $\omega$, a signal proportional to the virtual rotor speed, $\omega$, is supplied to a washout filter, thus obtaining the damping power reference, $P_D$.

The invention claimed is:

1. A method for controlling a power output of a grid forming wind turbine in order to dampen power oscillations between a power grid to which the wind turbine is connected and the wind turbine, the wind turbine comprising a generator, a machine side converter connected to the generator, a grid side converter configured to supply power to the power grid, and a direct current (DC) link interconnecting the machine side converter and the grid side converter, the method comprising the steps of:

providing a grid side power reference;

calculating a damping power reference depending on a grid frequency of the power grid or on a virtual rotor speed to dampen oscillations in the power output of the grid side converter;

calculating an inertia power reference proportional to a time derivative of the grid frequency;

controlling a power output of the grid side converter by converting DC power from the DC link into alternating current (AC) power according to the grid side power reference and the damping power reference;

generating a feedforward power reference for the machine side converter, the feedforward power reference including the damping power reference and the inertia power reference; and controlling a power output of the machine side converter by converting AC power from the generator into DC power at least partly based on the feedforward power reference.

2. The method according to claim 1, wherein generating the feedforward power reference comprises combining the damping power reference and the inertia power reference into a combined feedforward power reference, and wherein controlling the power output of the machine side converter is performed at least partly based on the combined feedforward power reference.

3. The method according to claim 1, wherein the step of generating the feedforward power reference comprises generating a first feedforward power reference based on the damping power reference and a second feedforward power reference based on the inertia power reference and wherein controlling the power output of the machine side converter is performed at least partly based on the first feedforward power reference and the second feedforward power reference.

4. The method according to claim 1, wherein generating the feedforward power reference is performed by a controller of the grid forming wind turbine.

5. The method according to claim 4, wherein generating the feedforward power reference is performed by a controller of the grid side converter.

6. The method according to claim 1, wherein generating the feedforward power reference is performed at least partly by a power plant controller configured to control a renewable power plant comprising the wind turbine.

7. The method according to claim 1, wherein calculating the damping power reference comprises calculating a damping power reference being proportional to a deviation between the grid frequency of the power grid and the virtual rotor speed.

8. The method according to claim 1, wherein calculating the damping power reference comprises applying a washout filter to a signal being proportional to the virtual rotor speed.

* * * * *